3,021,645
FURNACE CONSTRUCTION METHOD
William B. Silverman, Toledo, Ohio, assignor to Owens-Illinois Glass Company, a corporation of Ohio
Filed Sept. 19, 1955, Ser. No. 535,056
2 Claims. (Cl. 50—153)

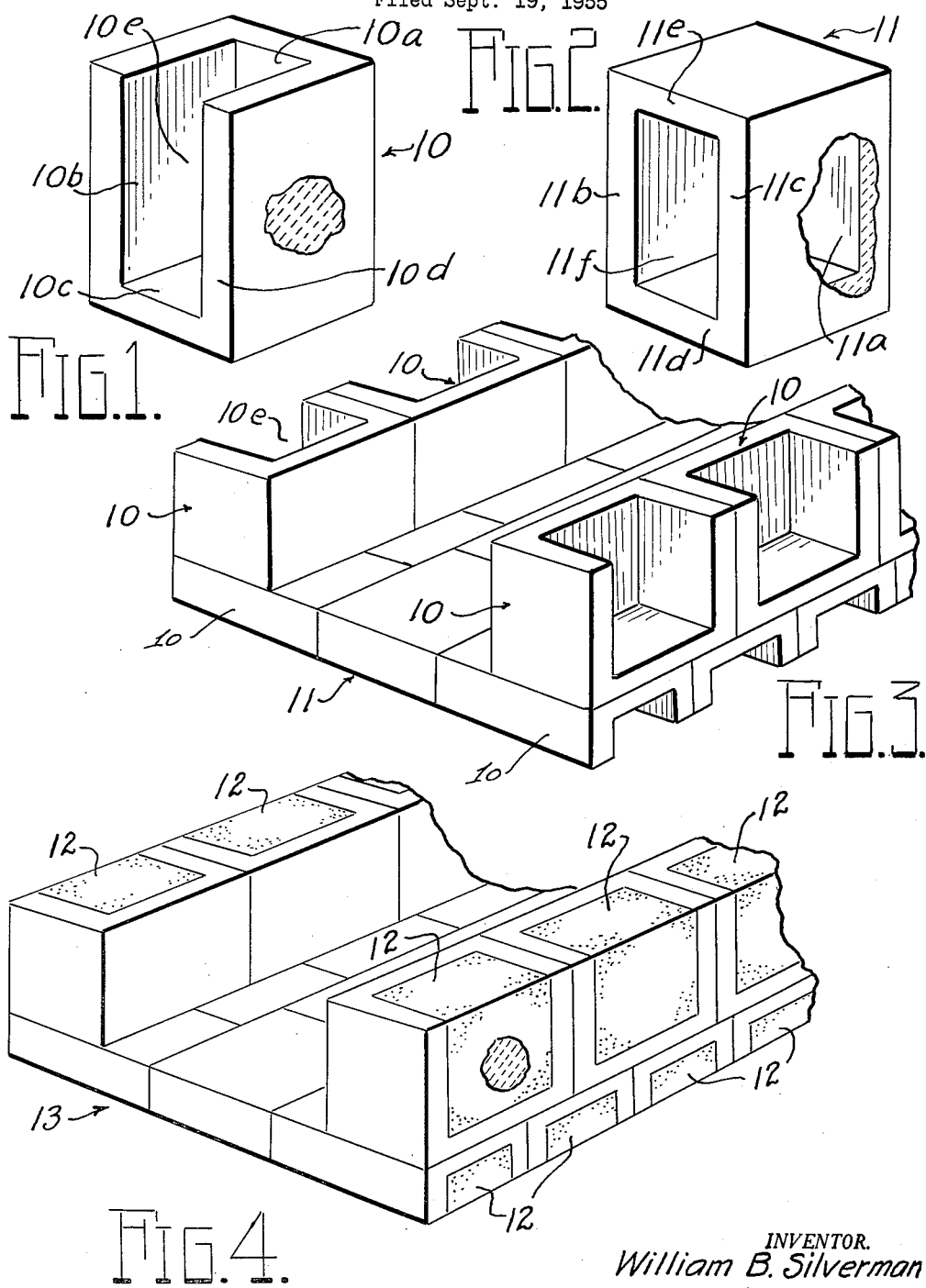
Feb. 20, 1962 — W. B. SILVERMAN — 3,021,645
FURNACE CONSTRUCTION METHOD
Filed Sept. 19, 1955
INVENTOR.
William B. Silverman

This invention relates to an improved method for constructing high-temperature furnaces or forehearths.

In the building of furnaces or forehearths for melting of glass or similar high-temperature materials, it is common practice to line the interior of such furnace with blocks of refractory materials. While certain desirable refractories have been developed for this purpose, providing satisfactory surface resistance to the deteriorating effects of the molten glass and the high-temperature gases to which it is subjected, all of such materials provide an economic problem because of their very high cost per pound or per cubic foot. Efforts have been made to overcome this economic disadvantage by applying a facing layer of such high grade refractory material upon a core of lower grade, cheaper refractory. This technique, however, has not been successful, due to defects in bonding the high grade refractory material to its core and to penetration of the molten glass into the joints between adjacent blocks to attack the low grade refractory core.

Accordingly, it is an object of this invention to provide an improved method of constructing interior liners of high-temperature furnaces or forehearths with refractory elements.

A particular object of this invention is to provide a method of furnace construction which permits the economical employment of high grade refractory materials in a furnace liner.

The specific nature of this invention, as well as other objects and advantages thereof, will become apparent to those skilled in the art from the following detailed description, taken in conjunction with the annexed sheet of drawings, on which, by way of preferred example only, is illustrated one embodiment of this invention.

On the drawings:

FIGURE 1 is a perspective view of one form of high grade refractory block shell utilized in the practice of this invention.

FIGURE 2 is a perspective view of a second form of refractory block shell utilized in the practice of this invention.

FIGURE 3 is a perspective view illustrating the manner of assemblage of the refractory block shells into a furnace or forehearth construction.

FIGURE 4 is a perspective view illustrating the finished refractory structure for a furnace or forehearth constructed in accordance with this invention.

There are a variety of well-known high grade refractory materials commercially available today which provide satisfactory corrosion-resistant properties to permit their use as furnace or forehearth liners. Some of these materials are commonly referred to as "alumina," "chrome," "sillimanite," "mullite," "zirconia-alumina-silica," etc. In accordance with this invention, one of such high grade refractory materials is formed into hollow block shell configurations such as the 4-walled construction 10 of FIGURE 1 or the 5-walled construction 11 of FIGURE 2. As will be apparent to those skilled in the art, these block shapes may be readily produced by molten casting, slip casting, or mechanical pressing. The block shell 10 of FIGURE 1 has an inside wall 10a and side walls 10b, 10c, and 10d respectively. The refractory block shell 11 has an inside wall 11a and side walls 11b, 11c, 11d and 11e respectively. The thickness of the inside walls 10a or 11a depends upon the type of refractory and its resistance to the deteriorating effects of the furnace, being proportioned to provide a desired furnace life. The thickness of the walls 10b, 10c ... or 11b, 11c ... is selected to permit convenient casting of such walls.

In accordance with this invention, a furnace or forehearth, or a liner for a furnace or forehearth, is constructed from the blocks 10 and 11 in the manner indicated in FIGURES 3 and 4. The hollow shell-like blocks 10 or 11 are assembled in side-by-side relationship. The 4-walled blocks 10 are utilized as elements of the vertical side walls of the furnace or forehearth and as the boundary elements of the bottom wall of the furnace or forehearth. The 5-walled blocks 11 are employed intermediate the boundary elements of the bottom wall or wherever more than one length of blocks 10 is required to effect a spanning of the required distance. Ordinarily, the length of the blocks 10 utilized in the side wall is selected to define the entire depth of the furnace or forehearth channel.

In all cases, blocks 10 and 11 are so assembled that all joints between the blocks are defined by full-depth abutting surfaces of the blocks 10 or 11. No joint is provided which is subjected to the action of the molten glass, which is only the thickness of the block walls. Furthermore, all of the blocks 10 and 11 are arranged so that their open faces are on the exterior of the furnace, permitting convenient access to the hollow portions 10e and 11f respectively of the blocks 10 and 11.

As the next step in the method embodying this invention, all of the hollow portions 10e and 11f of the described furnace structure are filled with a flowable mass of a low grade, inexpensive refractory. Uncured clay or unreacted calcium silicates, or similar economical materials, may be utilized and are preferably applied in a putty-like mass to fill the hollow portions 10e and 11f. Suitable temporary retaining forms (not shown) may, of course, be applied to the outer walls of the furnace structure to confine the flowable mass of low grade refractory.

The interior of the furnace is then heated to a temperature and for a length of time sufficient to effect the curing of the low grade refractory material 12. Such material, of course, solidifies and provides more than adequate structural strength and heat insulating properties to the furnace walls. The resulting furnace or forehearth 13, illustrated in FIGURE 4, then has all of its interior surfaces defined by a substantial thickness of high grade refractory material and all of the joints exposed to molten glass defined by abutting surfaces of such high grade refractory material having a depth equal to the full thickness of the furnace wall. Hence, any molten glass that penetrates the joints will be cooled and solidified in the joint, and the possibility of contact of the molten glass with the low grade refractory core 12 is eliminated. At the same time, a furnace can be constructed in accordance with this invention at a fraction of the cost required when utilizing solid block elements of high grade refractory.

It will be apparent to those skilled in the art that the principles of this invention are equally applicable to the construction of any high-temperature furnace or forehearth, and the employment of the term "furnace" in the appended claims is intended to include all such high-temperature structures.

It will, of course, be understood that various details of construction may be modified through a wide range without departing from the principles of this invention, and it is, therefore, not the purpose to limit the patent granted hereon otherwise than necessitated by the scope of the appended claims.

I claim:

1. A high temperature furnace construction which comprises side walls comprising a plurality of side-by-side positioned hollow four-walled blocks of a high-grade refractory material, said blocks each having one open face disposed outwardly and the other open face disposed upwardly; a bottom wall comprising a plurality of hollow four-walled blocks of a high grade refractory material positioned beneath said blocks constituting the side wall and each having one open face disposed outwardly and its other open face disposed downwardly, and a plurality of hollow five-walled blocks of a high-grade refractory material positioned intermediate said last-mentioned four-walled blocks, said five-walled blocks having their open faces disposed downwardly; and a core of heat-hardened low-grade refractory material positioned within said hollow blocks to thereby structurally reinforce said blocks and insulate said furnace, said furnace construction being further characterized by joints between said blocks and between said side walls and said bottom wall which are defined by abutting full-block-depth surfaces of said high-grade refractory material.

2. The method of constructing a glass melting furnace having a bottom wall and upstanding side walls comprising the steps of forming the bottom wall by side-by-side positioning of hollow four- and five-walled blocks of high-grade refractory material, said four-walled blocks constituting the boundary portion of said bottom wall with the open faces thereof disposed outwardly and downwardly, said five-walled blocks constituting the remainder of said bottom wall with the open faces thereof disposed downwardly, forming the side wall by side-by-side positioning of hollow four-walled blocks of high-grade refractory material positioned upon said boundary blocks with the open faces of said side wall blocks disposed outwardly and upwardly, whereby all joints of the furnace walls are defined by abutting full-depth surfaces of said high-grade refractory material, filling all of said hollow portions of said blocks with a flowable mass of incompletely cured low-grade refractory, and heating the interior of the furnace to cure and harden the low-grade refractory filling.

References Cited in the file of this patent

UNITED STATES PATENTS

| | | |
|---|---|---|
| 218,584 | Smith | Aug. 12, 1879 |
| 1,341,077 | Schaefer | May 25, 1920 |
| 1,891,604 | Peiler | Dec. 20, 1932 |
| 1,970,944 | Ross et al. | Aug. 21, 1934 |
| 2,268,251 | Haux | Dec. 30, 1941 |
| 2,358,652 | Nicholas | Sept. 19, 1944 |